UNITED STATES PATENT OFFICE.

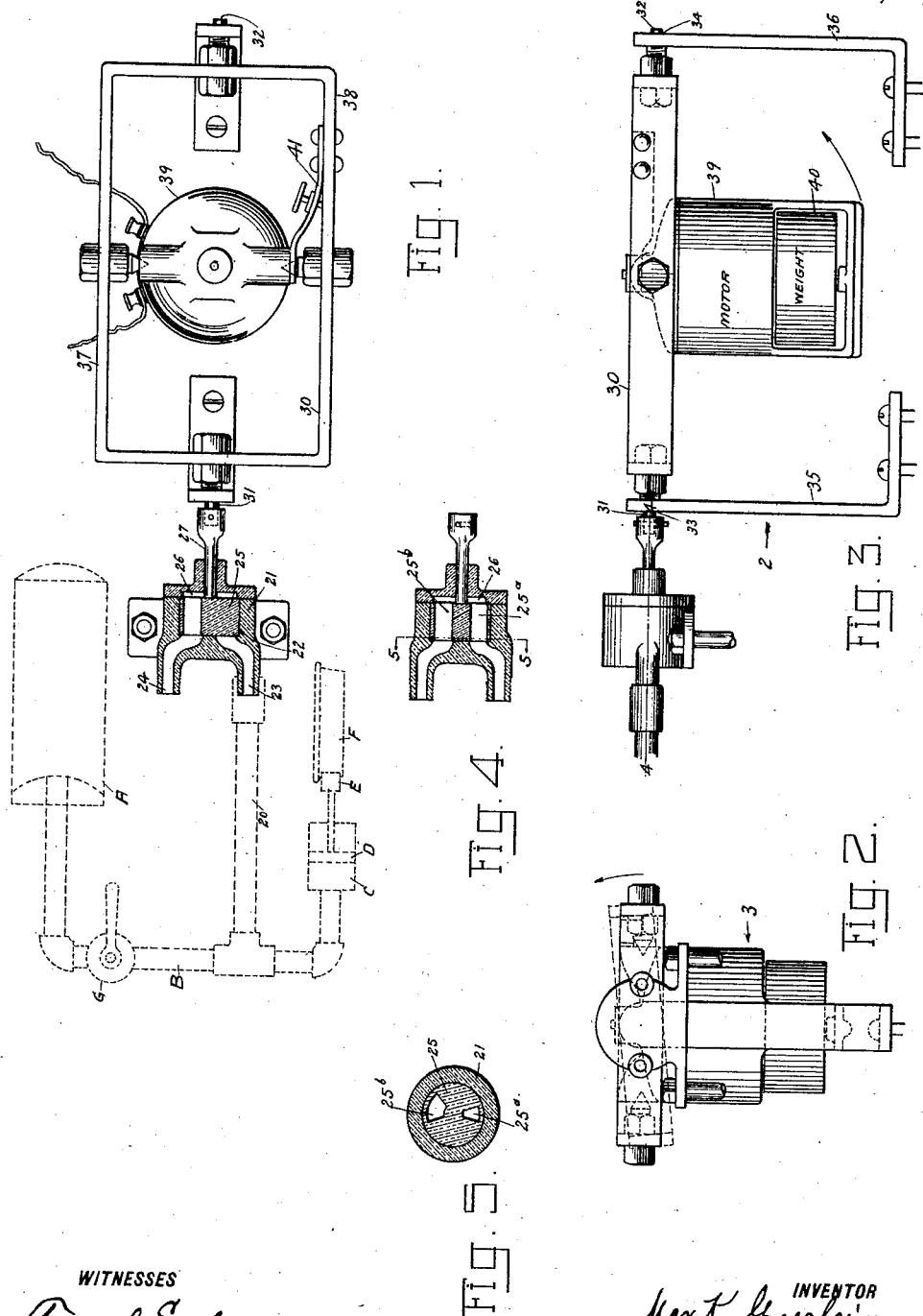

MAX K. GROSSHEIM, OF JERSEY CITY, NEW JERSEY.

AUTOMATIC AIR-BRAKE CONTROL.

1,050,825. Specification of Letters Patent. Patented Jan. 21, 1913.

Application filed September 2, 1911. Serial No. 647,334.

*To all whom it may concern:*

Be it known that I, MAX K. GROSSHEIM, a subject of the German Emperor, and a resident of Jersey City, county of Hudson, State of New Jersey, have invented certain new and useful Improvements in Automatic Air-Brake Control, of which the following is a specification.

This invention relates to improvements in automatic air brake control.

One of the objects of the invention is to so control air in the air pipe of the brake as to prevent what is known as "bad stops" when the air brakes are applied to check or stop the momentum of a car or train of cars. With this object in view the amount of air used is economized and there is a saving in wear on the wheels, brake shoes and rails.

Other objects will appear from the hereinafter description.

The objects above set forth are attained by the construction illustrated in the accompanying drawing where the invention is shown as applied to direct pressure system and to a single car. It is to be understood, however, that the invention may be applied to the multiple unit system in which case the controlling means is located in a pipe leading from the main air reservoir to the main train pipe. It is also to be understood that the invention is not confined to the construction here illustrated and described.

Referring to the drawing, in which the same reference character indicates the same part in the several views: Figure 1 is a diagrammatic plan view partly in section of one form of the invention. Fig. 2 is an end view looking toward the right in Fig. 3. Fig. 3 is a side elevation of certain parts shown in Figs. 1 and 2. Fig. 4 is a detail section of the means for controlling the air taken on line 4 of Fig. 3. Fig. 5 is another detail section on line 5 of Fig. 4.

The part marked A on the drawing represents the usual compressed air reservoir carried by a car. B is an air pipe leading from said reservoir to the brake cylinder C in which is the piston D to which is connected the brake shoe E which operates on the car wheel F.

G is the usual valve in the pipe B which controls the air from the reservoir A to the cylinder C. Connected to the pipe B between the valve G and cylinder C is a branch pipe 20.

21 is a valve casing having a valve chamber 22 therein and branches 23 and 24 leading therefrom, one of the branches 23 being connected to the pipe 22 and the other leading to air. Within the valve casing is the cylindrical valve 25 which controls the openings through the branches 23 and 24. This valve has openings $25^a$ and $25^b$ therein, which, in certain positions, register with said openings in the branches 23 and 24, and which at other times cut off said openings. The valve casing 21 and the valve 25 are so constructed that there is a passage 26 between one end of the valve and the inner end of the casing. Connected to the valve is a stem 27 which passes through an opening in the end of the casing which is mounted in any convenient place on the car.

30 is a frame having at each end thereof pivots 31 and 32 mounted in openings or bearings 33 and 34 in the uprights or supports 35 and 36 secured at any convenient place on the under side of the car. The pivot 31 is connected to the valve stem 27 and rotates said valve stem of the valve when the pivot is rotated. Pivotally suspended in the frame 30 on adjustable pins carried by the sides 37 and 38 of the frame is a motor 39 having a weight 40 secured to and rotating therewith. Secured to one of the sides of the frame 38, as shown, is an adjustable leaf spring 41 which is used to retard the swinging motion of the motor in order to obtain a long oscillation of the frame.

The parts described as above are mounted on a car. The motor is continuously running, and assuming that the car is moving toward the right, the valve G being in the position shown in the drawing with air cut off, and the valve 25 also in the position shown in Fig. 1 of the drawing with the opening in the pipe 23 covered, the motorman applies the brakes by operating the valve G to permit air from the reservoir A to enter the pipe B and the cylinder C. The piston D is then moved to apply the brakes to the wheels, whereupon the momentum of the car is checked. As soon as the momentum of the car is checked the pivoted motor swings to the right, as indicated by arrow, Fig. 3, and the rotary action of the motor and weight rocks the frame 30 on its pivots 31 and 32, into the position shown by dotted lines and the arrow in Fig. 2. This action of the frame 30 moves the valve 25 to the position shown in Fig. 4, for example, so that the opening in the branch pipe 23 is uncovered and the air in the pipe B and cylinder C passes through the branch pipe 23, through the opening 25$^a$ in the valve, through the passage 26, through the opening 25$^b$ and through the branch pipe 24 to air, whereupon the air, or a certain amount of it is released from the cylinder C and the brakes are thereby released. The motor and weight gradually swing back to their normal position and in proportion to the decreasing speed of the car. The frame 30 also turns to its normal position and the valve 25 moves to cover the opening in the branch pipe 23 and prevents air from escaping through the pipe 20. The motor and weight as suspended in the frame have a gyroscopic action and the amount of air released from the air brake system through the pipe 21 and branch 23 is in proportion to the decrease in the speed of the car. This construction automatically controls the air as applied to the brake and will effectively prevent bad stops regardless of the efficiency with which the motorman operates the air brake.

When what may be termed the gyroscope is located on a car or train using electric current, the gyroscope is driven by said current, but if located where such current is not accessible, it may be driven by mechanical means.

Of course, it is to be understood that the parts can be so arranged that when the car is moving backward or in the reverse direction, as hereinabove described, the passage for the escape of air through the pipe 23 can be probably controlled by the valve in the casing 21.

It is also to be understood that many changes may be made well within the scope of the invention, and especially as expressed by the claims, without departing from the spirit of the invention.

Having now described my invention, what I claim as new and desire to secure by Letters Patent is:

1. In an air brake system, a pipe, means connected to said pipe to control the release of air from the same in proportion to the decrease in the speed of a car and a gyroscope actuating said means.

2. In an air brake system, an air reservoir, a brake cylinder, an air pipe connected to said brake cylinder, a controlling valve in said pipe, means located between the cylinder and valve to release the air in said cylinder in proportion to the decrease in the speed of a car and a gyroscope for controlling said means.

3. In an air brake system for a car, an air reservoir, a brake cylinder, a pipe leading from the air reservoir to the brake cylinder, a valve in said pipe to control the air, a branch pipe between the valve and brake cylinder, a valve chamber having two branches, one connected to said pipe and one to atmosphere, a valve in said valve chamber to control communication between said branches, and a gyroscope for operating the valve upon the change of the speed of the car.

4. In an air brake system for a car, a pipe connected to said system, a valve chamber having two branches, one connected to the pipe and the other to atmosphere, a valve in said chamber to control said branches, and a gyroscope mounted on the car and connected to the valve whereby the said valve is operated to cover or uncover the communication with said branch pipe upon variation in the speed of the car.

5. In a device of the class described, an air reservoir mounted on a car, an air brake cylinder, a pipe leading from the reservoir to the cylinder, a controlling valve in said pipe, a branch pipe connected to said pipe, a valve chamber mounted on the car, having two branches one connected to the branch pipe and the other leading to atmosphere, a valve with openings located in said chamber, said openings adapted to communicate with the said branches of the valve, a chamber so arranged as to leave a passage between the two, a stem connected to said valve, a frame pivoted in supports mounted on the car, one of said pivots being connected to the valve stem, and a motor suspended in said frame, as and for the purpose set forth.

6. In an air-brake system, an air reservoir, a brake cylinder, an air pipe connected to said cylinder, a gyroscope, and means controlled by the gyroscope to release the air in said cylinder in proportion to the decrease in the speed of a car or train of cars.

7. In an air-brake system, an air reservoir, a brake cylinder, an air pipe connected to said cylinder, a valve in said pipe, a gyroscope, and means controlled by said gyroscope and located between the cylinder and valve to release the air in the cylinder in proportion to the decrease in the speed of the car.

8. In an air-brake system for a car or train of cars, an air reservoir, a brake cylinder, a pipe leading from the air reservoir to the brake cylinder, a branch pipe between the reservoir and the brake cylinder, a valve chamber having two branches, one connected to said branch pipe, and one to atmosphere, a valve in said valve chamber to control communication between said branches, and a gyroscope for operating the valve upon the change of the speed of the car or train.

9. In an air-brake system for a car or train of cars, an air reservoir, a brake cylinder, a pipe leading from the air reservoir to the brake cylinder, a valve chamber having two branches, one connected to said pipe and one to atmosphere, a valve in said chamber to control communication between said branches, and a gyroscope for operating the valve upon change of the speed of the car or train.

10. In a device of the class described, an air reservoir mounted on a car, an air-brake cylinder, a pipe leading from the reservoir to the cylinder, a valve chamber mounted on the car having two branches, one connected to the said pipe, and the other leading to atmosphere, a valve with openings located in said chamber, said openings adapted to communicate with the said branches of the valve, a chamber so arranged as to leave a passage between the two, a stem connected to said valve, a frame pivoted in supports mounted on the car, one of said pivots being connected to the valve stem, and a motor suspended in said frame, as and for the purpose set forth.

In witness whereof I have hereunto set my hand at the city, county and State of New York, this 1st day of September, 1911.

MAX K. GROSSHEIM.

In presence of—
   ISABEL R. RICHARDS,
   WM. A. MEGRATH.

---

Copies of this patent may be obtained for five cents each, by addressing the "Commissioner of Patents, Washington, D. C."